(12) United States Patent
Enstrom et al.

(10) Patent No.: US 9,934,518 B2
(45) Date of Patent: Apr. 3, 2018

(54) ONLINE REPUTATION IMPACTED INFORMATION SYSTEMS

(71) Applicant: SAS Institute Inc., Cary, NC (US)

(72) Inventors: Betsy Enstrom, Bloomington, MN (US); Andrew Ness, Crystal, MN (US)

(73) Assignee: SAS Institute Inc., Cary, NC (US)

( * ) Notice: Subject to any disclaimer, the term of this patent is extended or adjusted under 35 U.S.C. 154(b) by 469 days.

(21) Appl. No.: 14/641,781

(22) Filed: Mar. 9, 2015

(65) Prior Publication Data
US 2015/0278220 A1 Oct. 1, 2015

Related U.S. Application Data

(60) Provisional application No. 62/018,239, filed on Jun. 27, 2014, provisional application No. 61/973,239, filed on Mar. 31, 2014.

(51) Int. Cl.
| | |
|---|---|
| *G06F 7/00* | (2006.01) |
| *G06F 17/30* | (2006.01) |
| *G06Q 30/02* | (2012.01) |

(52) U.S. Cl.
CPC ............... *G06Q 30/0282* (2013.01)

(58) Field of Classification Search
CPC ................................. G06Q 30/0282
See application file for complete search history.

(56) References Cited

U.S. PATENT DOCUMENTS

| | | | |
|---|---|---|---|
| 2005/0149381 A1* | 7/2005 | Ravulapati | G06Q 30/06 705/400 |
| 2005/0187778 A1* | 8/2005 | Mitchell | G06Q 30/0278 705/306 |
| 2011/0106583 A1* | 5/2011 | Rozell | G06Q 10/02 705/7.29 |
| 2013/0006712 A1* | 1/2013 | Behlouli | G06Q 30/02 705/7.35 |
| 2014/0257938 A1* | 9/2014 | Green | G06Q 50/12 705/7.38 |

(Continued)

OTHER PUBLICATIONS

McGuire, Kelly, "Pricing in a Social World: How consumers use ratings, reviews and price when choosing a hotel", retrieved at <http://blogs.sas.com/content/hospitality/2013/10/24/pricing-in-a-social-world2/>, Oct. 24, 2013, 6 pages.

(Continued)

*Primary Examiner* — Kris Mackes
*Assistant Examiner* — Lin Lin Htay

(57) ABSTRACT

Various embodiments may be generally directed to techniques and an apparatus to generate a plurality of rate indices from the historical rate information for one or more products, each of the rate indices associated with a different lead time, and determine a rate of index from the plurality of rate indices associated with an optimal lead time based on a maximum correlation between the rate index and a reputation index, the reputation index based on the historical reputation information for the one or more products. In addition, a multiple linear regression model comprising one or more parameters may be generated using the rate index, the reputation index, and one or more indicator values, the multiple linear regression model may be used to determine a reputation impacted rate for a product.

34 Claims, 19 Drawing Sheets

(56) References Cited

U.S. PATENT DOCUMENTS

2014/0358633 A1* 12/2014 Wu .................. G06Q 30/0202
                                                                                                                                  705/7.31

OTHER PUBLICATIONS

McGuire, Kelly, "Pricing in a social world: Five tips for revenue managers", retrieved at <http://blogs.sas.com/content/hospitality/2013/06/21/pricing-in-a-social-world/>, Jun. 21, 2013, 4 pages.

Divito, Nicole, "IDeaS announces industry's first integrated solution for analyzing social media impact to hotel room pricing", Nov. 11, 2013, 3 pages.

"Bring Your Pricing up to Speed with IDeaS Reputation Pricing Module", IDeaS, a SAS Company, 2014, (author unknown).

Nelson, Tim, "IDeaS Introduces First in Revenue Management Technology", IDeaS, a SAS Company, Jun. 26, 2014, 2 pages.

"Rainmaker's GuestREV Integration and Rollout of Online Reputation Management Metrics Breaks New Ground in Evolution of Hospitality Revenue Management", The Rainmaker Group, Aug. 6, 2014, 2 pages (author unknown).

"ReviewPro Launches Revenue Optimizer to Increase Hotel RevPAR with Insights from Review Analytics", ReviewPro, Apr. 12, 2013, 3 pages, (author unknown).

Ness et al., "Reputation Management Impacted BAR Pricing", IDeaS, a SAS Company, 2014, 23 pages.

* cited by examiner

*200*

*200*

ONLINE REPUTATION IMPACTED INFORMATION SYSTEMS

This application claims the benefit of priority of 35 U.S.C. § 119(e) to U.S. Provisional Patent Application Ser. No. 61/973,239, filed on Mar. 31, 2014 and U.S. Provisional Patent Application Ser. No. 62/018,239, filed on Jun. 27, 2014, which are incorporated by reference in their entirety.

BACKGROUND

Online reputation systems may be used by consumers to generate and publish ratings and reviews for a variety of products, goods and/or services. Other consumers use these ratings and reviews to facilitate decision-making when considering a product, good or service to purchase. For example, hotel ratings may allow a consumer to filter the set of hotels to be considered during an online hotel booking. Ratings and reviews may also be used by a consumer when renting a rental car, purchasing an airline ticket, reserving a table at a restaurant, and so forth.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to determine reputation impacted rates. In one embodiment, for example, an apparatus may comprise a network interface, processing circuitry coupled with the network interface, and a rate index module operable on the processing circuitry to generate a plurality of rate indices from historical rate information for one or more products, each of the rate indices associated with a different lead time. The rate index module may also determine a rate index from the plurality of rate indices associated with an optimal lead time based on a maximum correlation between the rate index and a reputation index, the reputation index based on the historical reputation information for the one or more products. In some embodiments, the apparatus may also comprise a price determination module operable on the processing circuitry to generate a multiple linear regression model comprising one or more parameters using the rate index, the reputation index and one or more indicator values and determine a reputation impacted rate for a product with the multiple linear regression model based on the one or more parameters, a current reputation index associated with the product, a demand index associated with the product, and the one or more indicator values.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

Embodiments of this disclosure are illustrated by way of example, and not by way of limitation, in the figures of the accompanying drawings in which like reference numerals refer to similar elements.

DETAILED DESCRIPTION

Figure 1:
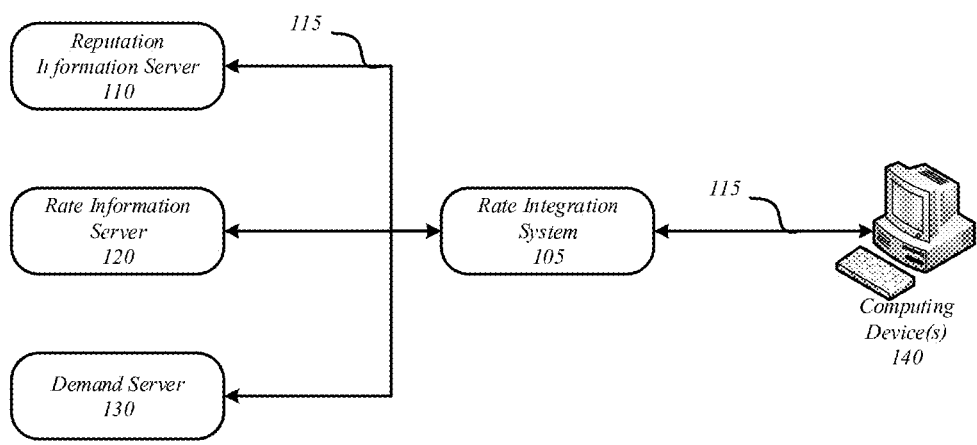
FIG. 1 illustrates an example of an embodiment of a system to determine reputation impacted rates.

As previously mentioned, online reputation systems may be used by consumers to generate and publish ratings and reviews for a variety of products, goods and/or services. Thus, consumers have more information than just price to compare products, goods and services. If consumers are using reputation in addition to price in their purchase decisions, businesses that incorporate their online reputation scores into their price sensitivity calculations will be better positioned to capture a consumer's willingness to pay. Until now, the ability to factor in reputation, ratings and reviews into prices has not existed. Thus, various embodiments are directed to solving these and other problems relating to a product's reputation and pricing.

Moreover, various embodiments may be directed to providing reputation impacted rates based on reputation information, demand information and rate information for a product such as a good or service. Moreover, various embodiments may be directed to using reputation management data from a source that is gathered and analyzed to form reputation indices having reputation scores. The reputation score is combined with demand information and a product's rates as well as those of its direct competitors to derive an optimal, reputation-impacted best available rate. The disclosed techniques can be used to analyze the effects of reputation management in various industries, including the hospitality industry, the airline industry and the rental car industry, for example.

In some implementations, the reputation impacted rate can be computed using the results from a multiple linear regression model using roughly one year of rate information and reputation information, and current demand information. In these implementations, rate and reputation indices can be computed in an effort to maximize the ability to detect the relationships between rates and product reputation without being too susceptible to noise in the data.

In some embodiments, the rate index for an occupancy date is calculated as the ratio of the rate of the product to the average rate of their competitor's products. The reputation index is calculated in a similar fashion. The rate for both the client and the competitor on an occupancy date actually may be the median rate on that particular occupancy date. Using the median rate helps protect against very high rates when a product or service is sold out and very low rates when product inventory is high, for example. In addition and when determining the reputation impacted rate, special event dates and the shoulder dates may also be determined and the rate indices may be adjusted accordingly. Lastly, the rate and reputation indices are manipulated by taking a 28-day moving average of each index, for example. This implementation is not limited to only having a 28-day moving average of each index, but may have other moving averages. This can help to both smooth out a day of week effect of the rates as well as minimize any potential pitfalls in a reputation due to one angry customer.

In addition to smoothing out the data, an optimal lead time between historical rate and reputation indices may be determined. This is done by computing the correlation between the two series with 0, 7, 14, 21, 28, and 42 day lags (lead time), for example. Whichever rate index is associated with the lead time that gives the maximum correlation is selected. Finally, the selected rate index, the reputation index and one or more parameters are used to generate the multiple linear regression model. This model may be used to determine reputation impacted rates for a product based on the one or more parameters, a current reputation index associated with the product, a demand index associated with the product, and one or more indicator values. Various embodiments are not limited in this manner and these and other details will become apparent with the following description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is referred to here and is generally conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared, and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a computer as selectively activated or reconfigured by a computer program stored in the computer. The procedures presented herein are not inherently related to a particular computer or other apparatus. Various machines may be used with programs written in accordance with the teachings herein, or it may prove convenient to construct more specialized apparatus to perform the required method steps. The required structure for a variety of these machines will appear from the description given.

FIG. 1 illustrates a general overview of a system 100 for determining reputation impacted rates for products. In some embodiments, a product may be any type of product, goods or services. For example and in some embodiments, system 100 may be used to determine reputation impacted rates for hotel rooms based on reputation information of a hotel and competing hotels. However, various embodiments are not limited in this manner and system 100 may be used to determine reputation impacted rates for other products, such as airline tickets, sporting event tickets, rental cars, entertainment show tickets, restaurants, or any other product, good or service for which reputation information may be available.

FIG. 1 illustrates the system 100 including a network environment having a rate integration system 105 coupled with a reputation information server 110, a rate information server 120 and a demand server 130 via one or more communication links 115. Further, the rate integration system 105 may also be coupled with one or more computing devices 140 via one or more communication links 115. In various embodiments, the servers 110, 120 and 130, the rate integration system 105 and computing devices 140 can communication information between each other via the one or more communication links 115 wired or wireless using one or more protocols. Further, the rate integration system 105, the servers 110, 120 and 130, and the one or more computing devices may represent one or more devices, nodes, components, infrastructure and so forth for processing information and data.

Moreover, the system 100 can be any type of networking environment including a home network, a corporate network, a small or large business network including any type of intranet or extranet, a local area network (LAN), a wireless local area network (WLAN), a wide area network (WAN), a metropolitan area network (MAN), a storage area network (SAN), a server area network, a small area network, a campus area network, a controller area network, a cluster area network, a personal area network (PAN), a desk area network (DAN), a cloud-based network and so forth. The system 100 may also include any number of network environments. For example, each of the servers 110, 120 and 130 may make up their own networking environment, alone or together. Similarly, the rate integration system 105 and computing devices may also define one or more network environments. Thus, each networking environment may be connected via the one or more communication links 115 to communicate information between each other via any suitable arrangement and protocol, for example.

In one or more embodiments, the reputation information server 110 may be a third party operated server that may collect reputation information for one or more products and provide it to the rate integration system 105. For example, the reputation information server 110 may be operated by a third party data provider, such as Brand Karma® or ReviewPro®. The third party data provider may collect reputation information from any number of different sources or channels and provide the reputation information from the sources as a collection of data. In some embodiments, these sources or channels may include reputation collectors or product review websites, such as Tripadvisor.com®, Hotels.com®, Oyster.com®, Hotelchatter.com®, Virtualtourist.com®, or any other reputation collector.

In some embodiments, the reputation information may be received or retrieved directly from the reputation collectors or product review websites. In some embodiments, a user of the system 100 may pick or choose which reputation provider, source or channel they want to provide the reputation information. For example, different sources or channels may be used more frequently in different locations. A user may select a source or channel that is most used in their particular location. Various embodiments are not limited in this manner.

Similarly, the rate information server 120 and the demand server 130 can also be third party operated servers which may communicate information with the rate integration system 105. For example, the third party data provider Brand Karma® may communicate rate information and demand information with the rate integration system 105.

In some embodiments, the reputation information server 110, the rate information server 120 and the demand server 130 may not be separate servers, as illustrate in FIG. 1, but may be one single server or any number of servers. In some embodiments, the data processing conducted by the servers 110, 120 and 130 may be conducted by the rate integration system 105 itself. For example, the rate integration system 105 may collect, determine and process reputation information, rate information and demand information. Various embodiments are not limited in this manner and system 100 may be configured in any manner.

The system 100 may include one or more computing devices 140 which may include any type of computing device. The one or more computing devices 140 may be representative of a networking environment for the consumer of the reputation impacted rate for a product. For example, the one or more computing devices 140 may be in a computing system of a hotel, airline, rental car company, and so forth. Various embodiments are not limited to these examples. Aspects of the current disclosure provide technical solutions to technical problems, such as the computing problems and inaccuracies involved in online booking, travel, ticketing and/or reservation systems. The disclosed techniques provide computing improvements and improved accuracy in these systems.

Figure 2A:
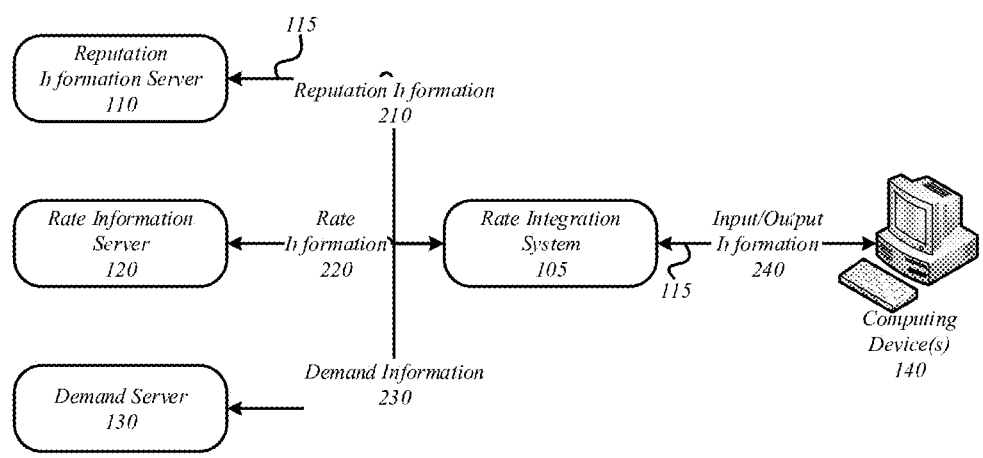
FIGS. 2A-2F illustrate example embodiments of information and processing flow diagrams to determine reputation impacted rates.

FIGS. 2A-2F illustrate embodiments of system 200 communicating information for determining reputation impacted rates for one or more products. In various embodiments, system 200 may be the same as or similar to system 100 of FIG. 1. Any type of information may be communicated between the servers 110, 120, and 130, the rate integration system 105, and the one or more computing devices 140, for example. More specifically, FIG. 2A illustrates reputation information 210 communicated between the reputation information server 110 and the rate integration system 105, rate information 220 communicated between the rate information server 120 and the rate integration system 105, and demand information 230 between the demand server 130 and the rate integration system 105. Further, input/output (I/O) information 240 may be communicated between the rate integration system 105 and the computing devices 140.

Figure 2B:
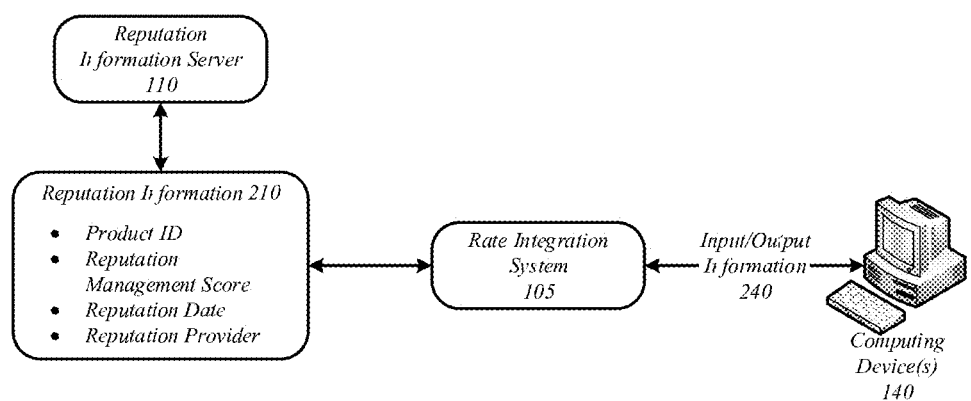

FIG. 2B illustrates a detailed view of the reputation information server 110 communicating reputation information 210 with the rate integration system 105. The reputation information 210 can be for one or more products including the product for which the reputation impacted rate is being determined and competing products from competitors. The reputation information 210 can include historical reputation information, for example, from the prior one to twelve months for the product and competing product. Various embodiments are not limited in this manner and the reputation information 210 may be historical reputation information any amount of time.

In some embodiments, the reputation information 210 may be communicated with the rate integration system 105 for a single product or a group of products. For example, the reputation information server 110 may send reputation information 210 corresponding with the product for which the reputation impacted rate is being determined. In another example, the reputation information 210 may be sent for a group of products such as the product for which the reputation impacted rate is being determined and competing products, or competing products alone. Various embodiments are not limited in this manner.

In some embodiments, the reputation information 210 may include information such as, a product identification (ID), a reputation management score, a reputation date, and a reputation provider. The product ID can be any combination of one or more symbols and alphanumeric characters that can be used to accurately identify a product. For example, in the case of a hotel the product ID may be a name of a hotel or a hotel identifying code. Further, each product may be associated with a unique product ID such that it may be distinguishable from other products. In addition, the product ID may uniquely identify products offered by the same providers. For example, if two or more products are each a different hotel room offered by the same brand but at same or different location, each hotel room may be uniquely identified by a product ID, or in some instances each hotel may be uniquely identified. Various embodiments are not limited in this manner.

The reputation management score can be any score for use in determining a reputation. The reputation management score may be based on a single review or a group of reviews for a product, for example the product identified by the product ID. Further, the reputation management score may be a single score from a single source, multiple scores from a single source, or multiple scores from multiple sources. Various embodiments are not limited in this manner. As will be discussed in more detail, each reputation management score may be associated with a reputation date for a product.

In some embodiments, the reputation management score can include one or more of quantitative information and qualitative information. The quantitative information may be any type quantifying score, such as a numerical score, a 'star' score, or any other type of quantifying score. For example, the quantifying score may be a score of 3 out of 5, 4 stars out of 5 stars, 50 out of a 100, and so forth. Various embodiments are not limited in this manner.

The reputation management score including the qualitative information may be a score based on qualitative attributes, such as information found in a written description. In some embodiments, the qualitative information may be quantized to more easily use in determining a reputation impacted rate. For example, a review of a product may be quantized and a sentiment score may be determined by analyzing the review and looking for 'positive' and/or 'negative' keywords. Moreover, the sentiment score may be generated based on the review being more 'positive' or more 'negative.' The qualitative information may also be standardized and/or aggregated into a single sentiment score that may be used for comparison. In some embodiments, the qualitative information may be processed by one or more modules, components or any other type of software, such as SAS's Sentiment Analysis® Software.

In some embodiments, the reputation management score for a review includes both quantitative information and qualitative information which can be combined together to generate an aggregate score for the quantitative information and qualitative information. Similarly, the aggregate score may be standardized such that it can be used in comparison with other products or the same product on different dates. In some embodiments, each product may have a single aggregated reputation management score for each date of a specified time period. In some embodiments, the rate integration system 105 may receive the reputation information 210 having a single aggregated reputation management score. However, various embodiments are not limited in this manner, and in some embodiments, the rate integration system 105 may generate a single aggregate reputation management score based on information in the reputation information 210.

The reputation information 210 may also include a reputation date and a reputation provider. The reputation date may be the date in which a review was provided or may be the date that the use of the product took place. For example, the reputation date may be the date in which a user provided a review for the product. However, in another example, the reputation date can be the date that a user or person used the product. More specifically, the reputation date may be a date a user stayed at a hotel, flew on a plane, rented a car and so forth. In some embodiments, the reputation date may be a single date. However, various embodiments are not limited in this manner and the reputation date may be a range of dates. For example, the reputation date may represent a range of a dates a user stayed at a hotel, used car, flew on a plane and so forth. Further and as previously mentioned, each reputation management score may be associated with a reputation date.

In some embodiments, the reputation information 210 may include one or more reputation providers which may be any provider of the reputation information 210 and reputation management scores. As previously mentioned, the reputation information 210 may be received or retrieved from a reputation information server 110 which may be a third party provider, such as Brand Karma® or any other source or channel. The third party provider may be identified by a user of the system. However, in some embodiments, the reputation information 210 may include information from a number of sources and each of the sources may be identified in the reputation information 210. For example, if the reputation information 210 includes information from a number of reviews on different websites such as tripadvisor.com, hotels.com, orbitz.com, and so forth, each of those sources may be identified as the reputation provider. Various embodiments are not limited in this manner.

The reputation information 210 is not limited to the above-discussed information and may include additional or less information. Further and as will be discussed in more detail below, the reputation information 210 may be used to generate one or more indices for use in determining a reputation impacted rate for a product.

Figure 2C:
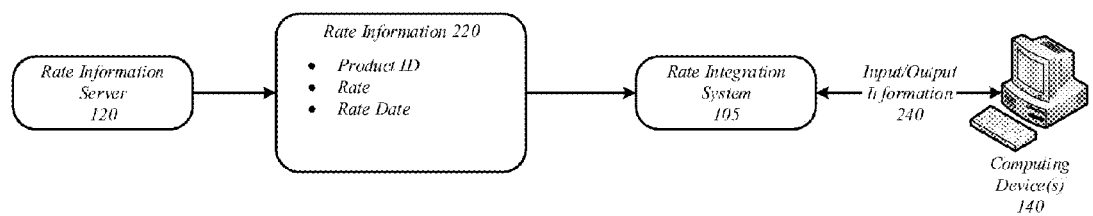

FIG. 2C illustrates a detailed view of the rate information server 120 communicating rate information 220 with the rate integration system 105. The rate information 220 can be for one or more products including the product for which the reputation impacted rate is being determined and competing products from competitors. The rate information 220 can include historical rate information, for example, from the prior one to twelve months for the product and competing product. Various embodiments are not limited in this manner and the rate information 220 may include historical or future rate information during any time period. In some embodiments, the products may include hotel rooms, flights, rental cars, or any other product that can have a price or rate.

The rate information 220 may include a product ID to identify the product, the rate or price of the product, and the rate date. As similarly discussed above, the product ID in the rate information 220 can be any combination of one or more symbols and alphanumeric characters that can be used to accurately identify a product. The rate may be any value including a monetary value for a product. For example, the rate may be the price or cost in dollars or any other currency for the product.

Further, the rate information 220 may include a rate date which may be associated with a rate. More particular, the rate may be the price or cost of a product on a rate date. In some embodiments, a product may have more than a single rate for the same date. For example, the cost or rate of a product for the same date may be different for different users and may change over time. When more than one rate for a product on a same date is presented, the rate for a rate date may a best available rate for a product. Various embodiments are not limited in this manner.

The rate information 220 may be provided to the rate integration system 105 or may be retrieved by the rate integration system 105 from the rate information server 120. The rate information 220 may be used to generate one or more indices, as will be discussed in more detail below, and used to determine a reputation impacted rate for a product.

Figure 2D:
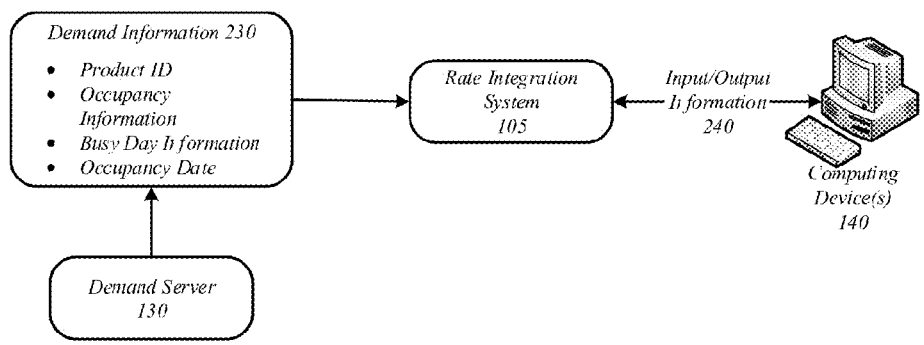

FIG. 2D illustrates a detailed view of the demand server 130 communicating demand information 230 with the rate integration system 105. The demand information 230 can be for one or more products including the product for which he reputation impacted rate is being determined and competing products from competitors. The demand information 230 can include historical demand information and future demand information. The historical demand information may be, for example, from the prior one to twelve months for the product and competing products. Further, the future demand information may be include predicted demand for future period of time.

In embodiments, the demand information 230 may include product ID, occupancy information, busy day information, and occupancy date. The product ID may be the same as previously discussed such as any information to identify the product for which the demand information 230 is for. The demand information 230 can include a measurement or metric of a consumer's wiliness to pay a rate for a specific product or service. In the case of a hotel room, this measurement or metric may include occupancy information which may be a percentage of rooms occupied. For example, the occupancy information may indicate that a hotel is at 95% occupancy or 95% of the rooms are occupied on a particular night. Various embodiments are not limited to this example and, in some embodiments, the measurement or metric may be different for different products. For example, in the case of a flight the metric can be the measurement or percentage of occupied seats. In another example and in the case of a restaurant, the measurement may be a percentage of tables occupied. Other metrics and measurements may be used for the same or different products.

The demand information 230 may include a demand or occupancy date. For example, the occupancy information may be associated with a particular occupancy date and each occupancy date may have different occupancy or demand information. In some embodiments, the occupancy date may be a demand date which may be a date on which a metric or measure is determined.

In some embodiments, the demand information 230 can include outlier information or busy day information which may indicate a date having demand above or below a norm. In some embodiments, the outlier information may indicate the occurrence of a special event which may generate an increase demand and drive rates higher, for example. The outlier information may be used to filter out information, such as the reputation information 210, rate information 220, and demand information 230, for the indicated dates when determining the reputation impacted rate.

The demand information 230 may also be used to generate one or more indices and to determine a reputation impacted rate for a product. These and other details will become more apparent in the following description.

Figure 2E:
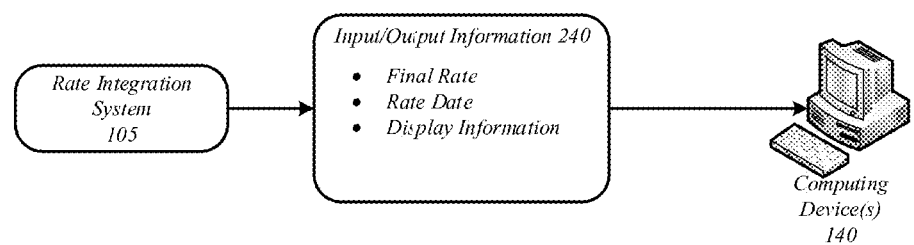

FIG. 2E illustrates a detailed view of the rate integration system 105 communicating input/output information 240 with the one or more computing devices 140. The input/output information 240 may at least include a final rate, a rate date and display information. As will be discussed more detail below with respect to FIG. 3, the rate integration system 105 may determine a final rate for a product based on information including the reputation information 210, the rate information 220 and the demand information 230, and provide the final rate to the one or more computing devices 140. The final rate may be presented to a user or consumer as the rate for the product. The input/output information 240 may also include a rate date. For example, if the rate is for a product such as hotel room, a flight, or a rental car, the rate date may be the date to stay at hotel, the date of the flight or the date of the rental car, respectively.

The input/output information 240 may also include display information which may be used when presenting the final rate to a user of the computing devices 140. For example, the display information may include one or more graphs or charts illustrating the final rate for the product versus the rates of its competitors. In some embodiments, the display information may illustrate the final rate along with at least one of historical rate information, historical reputation information and historical demand information. Various embodiments are not limited in this manner and the final rate may be displayed in any manner.

Figure 2F:
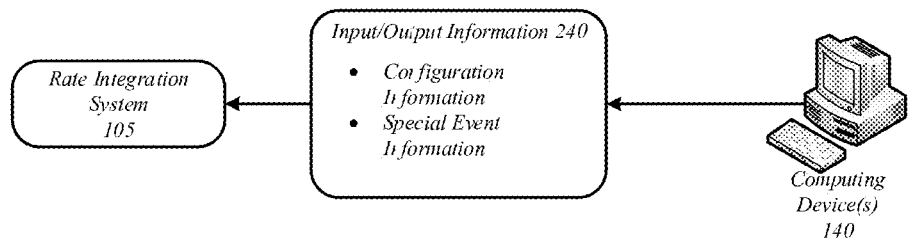

FIG. 2F illustrates a detailed view of the rate integration system 105 communicating input information 250 with one or more computing devices 140. The input information 250 may be any information that is used by the rate integration system 105 to determine a reputation impacted rate for a product. The input information 250 may include configuration information from the consumer of the final rate, such as the hotel operator, an airline, a rental car company and so forth. For example, the configuration information may include desired minimum values and maximum values defining a range of rates to use when determining a final rate. In other words, the consumer may set upper and lower boundaries for the final rate.

The input information 250 may also include outlier information, busy day information and special event information for a product to use when determining the final rate. The information may also to exclude information from particular dates, for example the dates of a special event such as a wedding, a conference, and so forth. The input information 250 may also include any other type of information that may be used by the rate integration system 105 to determine a final rate for a product. Various embodiments are not limited in this manner.

Figure 3:
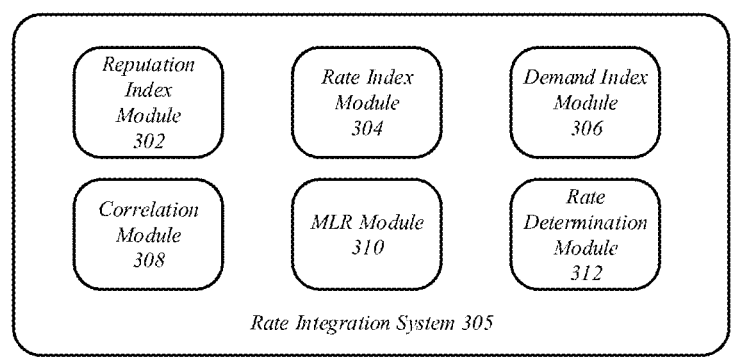
FIG. 3 illustrates an example of an embodiment of a computing system to determine reputation impacted rates.

FIG. 3 illustrates an embodiment of computing system 300, such as a rate integration system 305 to process reputation information 210, rate information 220 and demand information 230 and to determine reputation impacted rates for products. The rate integration system 305 may be implemented on any type of computing device and in hardware only, software only, or combination thereof. For example, one or more of the modules of the rate integration system 305 may be implemented and executed on processing circuitry.

Further, the rate integration system 305 may include one or more modules including a reputation index module 302, a rate index module 304, demand index module 306, a correlation module 308, a multiple linear regression (MLR) module 310 and a rate determination module 312. These modules may communicate information over one or more interconnects, such as any type bus, trace, connect, and so forth. In addition, the modules can communicate information with each other via any type of bus, trace, communication link, and so forth. Various embodiments are not limited in this manner.

In various embodiments, the reputation index module 302 may receive and communicate reputation information 210, generate reputation indices including historical and current reputation indices and communicate information to determine reputation impacted rates. The rate index module 304 can receive and communicate rate information 220 and input/output information 240, generate rate indices including historical and lead time rate indices and communicate information to determine reputation impacted rates. Similarly, the demand index module 306 may receive and communicate demand information 230, generate demand indices including historical and future demand indices and communicate information to determine reputation impacted rates. These and other details will become more apparent with the description of FIGS. 4A-4D.

The rate integration system 305 includes a correlation module 308 to determine a correlation between reputation information and rate information, and in particular, between the reputation indices and the rate indices. For example, the correlation module 308 may determine a maximum correlation between lead time rate indices and reputation indices. In some embodiments, the rate integration system 305 having the MLR module 310 may use the lead time rate index having the maximum correlation value with a reputation index to generate a multiple linear regression (MLR) model. In some embodiments, the reputation impacted rates may be determined by the rate determination module 310 using the MLR model and other information, for example. These and other details will become more apparent with the description of FIGS. 4A-4D.

Figure 4A:
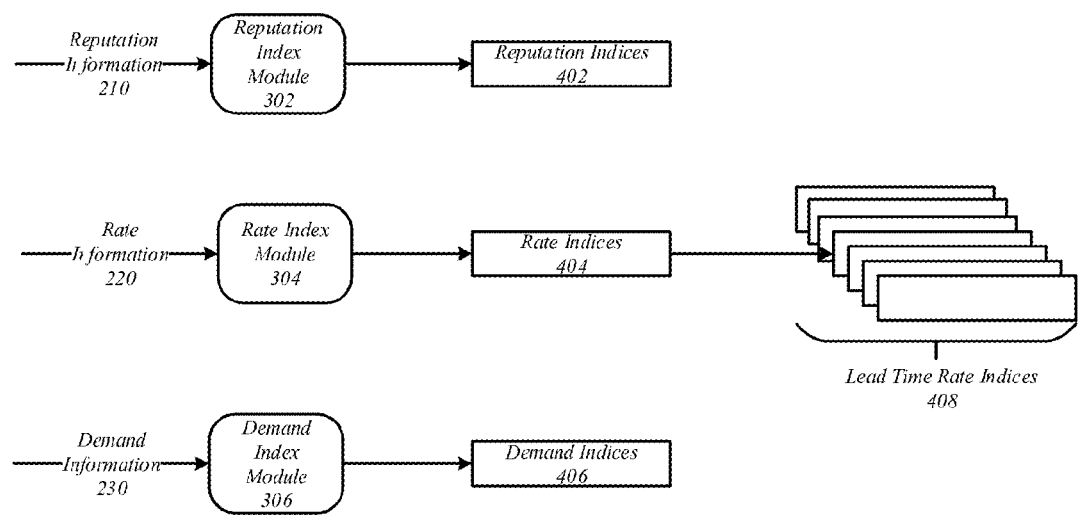
FIGS. 4A-4D illustrate example embodiments of a computing system to determine reputation impacted rates.

FIGS. 4A-4D illustrate various embodiments of computing system, such as the rate integration system 305, to determine reputation impacted rates for products. With respect to FIG. 4A illustrates the reputation index module 302 receiving reputation information 210 and generating reputation indices 402, the rate index module 304 receiving rate information 220 and generating rate indices 404 and lead time rate indices 408, and the demand index module 306 receiving demand information 230 and generating demand indices 406.

In some embodiments, the reputation index module 302 may receive the reputation information 210 from a reputation information server 110, as previously discussed. The reputation information 210 may include historical reputation information for one or more products including the product for which the reputation impacted rate is being determined and competing products. In some embodiments, the reputation information 210 includes reputation management scores for each product and one or more dates during a specified time period. For example, each product may have a reputation management score associated with each date for the past week, month, year, and so forth which may be received as reputation information 210.

The reputation management score can be a score based on one or more of quantitative information and qualitative information, as previously discussed. In some embodiments, the reputation management scores for products may be received from the reputation information server 110 in a standardized format, e.g. on a standard scale, so that they can used to generate a reputation index for each product. However, in the same or other embodiments, the reputation management score may be need to be standardized. In these embodiments, the reputation index module 302 may receive the reputation information 210 and perform a standardization on the reputation management scores. The reputation index module 302 can shift scores so that negative scores become positive, for example. Moreover, reputation management scores may be received from a reputation information server 110 in a range of −100 to 100 and may be shifted in a positive direction by 100 to ensure there are no negative numbers. Negative numbers may be converted to positive numbers to ensure that an average reputation management score of zero is not calculated during the determination of the reputation impacted rate.

In some embodiments, the reputation index module 302 may determine an average reputation management score for each date for the products. For example, more than one reputation management score may be received on a particular date for a product. The combined reputation management scores on that particular day may be averaged together to generate a single reputation management score for a product on each date. Moreover, the average reputation management score may include multiple reputation management scores from different channels or sources or from a single channel or source. The average reputation management score for each date for each product may be used when generating the reputation index for the particular product.

Similarly, the reputation index module 302 may also calculate or generate a 28-day moving average reputation management score for each product. For example, the 28-day moving average reputation management score, may be an average reputation management score for the past 28-days from a particular date in time and can be used to smooth out short-term fluctuations. In some embodiments, a 28-day moving average reputation management score may be determined for each of the products including the product for which the reputation impacted rate is being determined and for competing products. The reputation index module 302 can also transpose the 28-day moving average reputation management scores for each product so that there is a reputation management score which may be the average reputation management score discussed above, and a 28-day moving average reputation management score for each date and for each of the products. The 28-day moving average reputation management scores may be transposed so that a reputation score of the product and average reputation scores of the product's competitor may be compared.

The reputation index module 302 may use the transposed information including the average reputation management score and the 28-day reputation management scores for each date in a time period and associated with a product to generate a reputation index the product. More specifically, the reputation index module 302 may generate a reputation index 402 for a product including a plurality of dates each associated with a ratio between the reputation management score for the product for the date and the average of the reputation management scores for the product and the competing products for that same date. In some embodiments, the reputation management score for the product may be the average reputation management score for that particular date. Similarly, the average of the reputation management scores for competing products may be an average of average reputation management scores for that particular date. The reputation index module 302 may create a number of reputation indices 402, each associated with a particular product and each having dates associated with ratios as discussed above.

FIG. 4A also illustrates the rate index module 304 receiving rate information 220 and generating rate indices 404 and lead time rate indices 408. The rate index module 304 may generate rate indices 404 for each product. Each rate indices 404 can include a plurality of dates each associated with a ratio between the median rate for the product and an average of median rates for competitor products and the product. In other words, the average of median rates may include median rates for competitor products and the median rate for the product. The plurality of dates may be for a time period, such as a week, a month, a year, and so forth.

Further and in some embodiments, the median rate for a product may be a median of best or lowest available rates for the product for a particular date over a giving period of time. For example and in the case of a hotel, the best available rate for a room on a particular date may change over time and the best available rate may be the lowest available rate found or determined on that particular date. The median rate used when generating the rate indices may be the median of these best available rates for the product on that particular date. The rate index module 304 may determine an analysis time period to select best available rates from when determining the median rate. For example, the rate index module 304 may select the best available rates for a particular date over particular ranges of dates such as a week, a month, or any other period of time.

In various embodiments, the best available rates for products may be web-based rates, or rates determined by doing an Internet crawl to gather rate information for the products including the competitor products and may be the lowest rate found for the product. The Internet crawl may be conducted by the rate information server 120 and provided in the rate information 220 to the rate integration system 105 and rate index module 304. However, various embodiments are not limited in this manner and rates used to generate the rate indices 404 may be from other sources of information, such as pricing catalogs or directly from the seller of the product.

In some embodiments, the rate index module 304 may filter out rates for particular dates when generating the rate indices 404. For example, outlier information, busy day information and special events can indicate dates which may have abnormal changes in a rate for a product. In the case of a hotel, rooms during special events such as a wedding, a conference, a convention, a banquet, and so forth may abnormally increase rates for the dates the special events occur on, for example. Thus, the rates on days of these busy days or special events may be left out when calculating and determining the rate indices 404.

Moreover, in some embodiments, the rates may be filtered out for some products, but not others on a particular date. For example, a wedding occurring a particular hotel may abnormally adjust the rate for rooms for that particular hotel, but not other hotels. In these instances, the rates for only the effected products will be left out of the rate indices 404. Further, rates for dates surrounding a special event may also be left out of the determination process. For example, an outlier event, busy day or special event may abnormally change the rates of a product leading up to the special event or after the special event. Thus, rates may also be left out for these dates.

In some embodiments, the rate index module 304 may use average rates for products to determine and generate the rate indices 404. For example, the rate index module 304 may generate a rate index for each product including a plurality of dates each associated with a ratio between the average rate for the product and an average of average rates for competitor products (and the product). Additionally, the rate index module 304 may use a 28-day moving average rates for the products to generate the rate indices 404. The 28-day moving average rate may be used to smooth out variances and fluctuations of rates by determining an average rate over a period of time, such as a number of days, weeks, months and so forth. Various embodiments are not limited in this manner.

When generating the rate indices 404, the rate index module 304 can transpose, the average or median data such that there is a rate and an average rate for each product on each date in the rate index. The rate and average rate value may then be used to generate rate indices 404, as previously discussed, by associating dates with ratios of an average rate for the product and average of average rates for competitor products (and the product).

The rate index module 304 may create one or more rate indices 404 for each product having rates associated with each date during a specific time period, as previously discussed. Further, the rate index module 304 may also generate or adjust the rate indices 404 to create lead time rate indices 408. The lead time rate indices 408 can be used to determine a correlation between rates and reputations of a product. As can be appreciated, a particular reputation date for a reputation management score may not directly correspond to a rate date for a rate for a product. More specifically, there may be lead (or lag) time between the rate date on which the product was purchased and the reputation date of a reputation management score for the product. For example, a lead time may refer to the time between when a customer shops or looks for a rate and then posts a review on a source's our channel's website. As will be discussed in more detail below with respect to FIG. 4B a correlation between a rate and a reputation management score of a product may be determined.

Figure 4B:
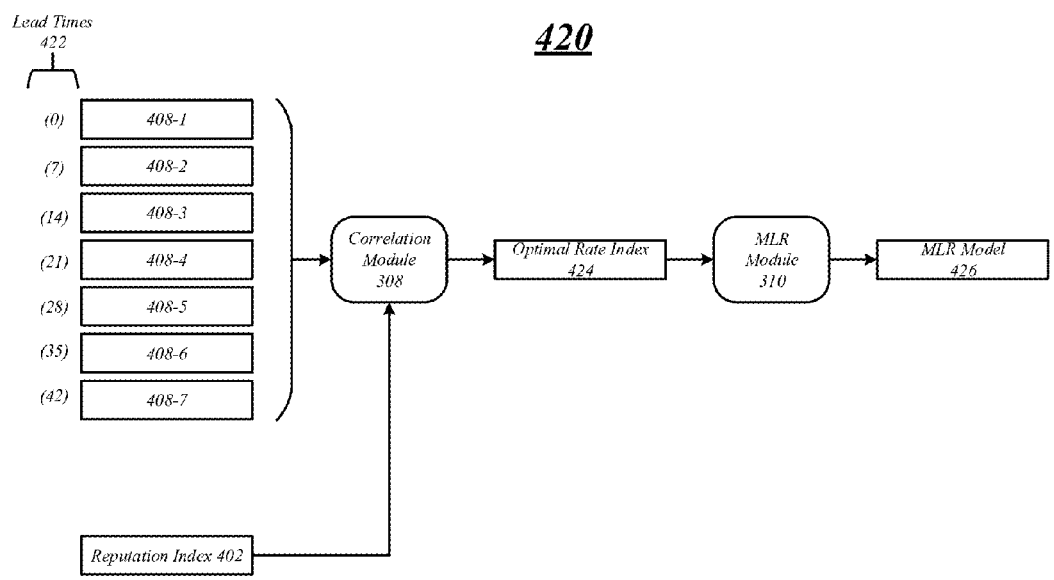

In some embodiments, the rate index module 304 may generate the lead time rate indices 408 by shifting the rate date backwards in time. For example, the dates in a rate index 404 associated with a product may be shifted backwards in time by 7, 14, 21, 28, 35 or 42 days. Moreover, the rate index module 304 may generate a number of lead time rate indices 408 having different shifts or lead times for each rate index 404 of a product. In some embodiments, dates may be shifted by 0, 7, 14, 21, 28, 35, and 42 days when generating the lead time rate indices 408 and as illustrated in FIG. 4B at lead times 422. The rate index module 304 may generate the lead time rate indices 408 for all of the products including competitor products or for the product for which the reputation impacted rate is be determined Various embodiments are not limited in this manner.

FIG. 4A also illustrates the demand index module 306 receiving demand information 230 and generating demand indices 406. The demand index module 306 may generate one or more demand indices 406 for each product including a plurality of dates each associated with a ratio between a demand value for the product and an average demand values for competitor products and the product. The plurality of dates may be for a time period, such as a week, a month, a year, and so forth.

In various embodiments, the demand index module 306 may determine demand indices 406 from the demand information 230 including historical demand information for products for dates in the past and future demand information for products for dates in the future. The demand for a product may be determined in any suitable manner. For example and in the case of a hotel, the demand may be an occupancy rate or a percentage of a number of rooms booked of the total number of rooms available. The same kind of determination can be made for flights, rental cars, restaurants and so forth. Various embodiments are not limited in this manner.

FIG. 4B illustrates an embodiment of the rate integration system 305 determining an optimal rate index 424 and a multiple linear regression (MLR) model 426 for the product to determine a reputation impacted rate. More specifically, the correlation module 308 can determine an optimal rate index 424 for rates and reputations based on one or more lead time rate indices 408 and reputation indices 402. Further, the MLR module 310 may generate an MLR model using the optimal rate index 424 which may be a predicted rate index.

The correlation module 308 can receive or retrieve the lead time rate indices 408 from the rate index module 304 which may include, for example, a lead time rate index 408-1 corresponding with a zero lead time (or unadjusted), a lead time rate index 408-2 corresponding with a one week or seven day lead time, a lead time rate index 408-3 corresponding with a two week or fourteen day lead time, a lead time rate index 408-4 corresponding with a three week or twenty-one day lead time, a lead time rate index 408-5 corresponding with a four week or twenty-eight day lead time, a lead time rate index 408-6 corresponding with a five week or thirty-five day lead time, and a lead time rate index 408-7 corresponding with a six week or forty-two day lead time. The lead time rate indices 408 used to determine an optimal rate index 424 are generally for the product for which the reputation impacted rate is being determined and not the competitor products. However, various embodiments are not limited in this manner.

The correlation module 308 may also receive or retrieve one or more reputation indices 402 from the reputation index module 302. Similarly, the correlation module 308 typically uses the reputation index 402 for the product the reputation impacted rate is being determined. In various embodiments, the correlation module 308 may use the lead time rate indices 408 and the reputation index 402 corresponding with the product to determine a maximum correlation, and in particular, an optimal rate index 424 for the product having a maximum correlation with a reputation index 402 based on a lead time.

In some embodiments, the correlation module 308 may perform a correlation function for each of the seven lead time rate indices 408-1 through 408-7 and the reputation index 402 of the product using Pearson product-moment correlation coefficient, for example. Equation 1 illustrates a correlation function to determine an optimal rate index 424 for the product.

$$\rho lead_i = Corr(Rate\ Index_j, Reputation\ Index_{j, lead_i}). \quad (1)$$

In equation 1, j represents the historical demand or occupancy dates in a historical calibration period and $lead_i$ represents different lead days, for example, for where $i \in \{0, 7, 14, 21, 28, 35, 42\}$. The optimal lead time and optimal rate index 424 may be determined based on which of the different lead time rate indices 408 has the highest or maximum positive correlation with the reputation index 402 for the product. Equation 2 may be used to determine the maximum positive correlation.

$$\hat{\rho} = \max_{lead_i, \rho lead_i} \ i \in \{0, 7, 14, 21, 28, 35, 42\} \quad (2)$$

In various embodiments, the correlation module 308 may determine the optimal rate index 424 or the rate index having the maximum positive correlation and the MLR module 310 may determine or fit a multiple linear regression (MLR) model 426 to the optimal rate index 424. In some embodiments, the MLR module 310 can also use the reputation index, and weekday and weekend indicators as independent variables when fitting the MLR model 426 to the optimal rate index 424. Equation 3 may be used to generate the MLR model 426 having one or more parameters by the MLR module 310.

$$\text{Rate Index}_{\hat{\tau},j} = \overline{\beta_0} + \overline{\beta_1} * \text{Reputation Index}_j + \\ \overline{\beta_2} * \text{Weekday}_j + \overline{\beta_3} * \text{Demand Index}_j + \\ \overline{\beta_4} * \text{Busy Day Indicator}_j + \overline{\beta_5} * \text{Reputation Index}_j * \text{Weekday}_j \quad (3)$$

In equation 3, j represents historical occupancy dates in a historical time period, $\hat{\tau}$ is the selected lead time that was determined to have a maximum positive correlation and $\tilde{\beta}$ represents the one or more parameters.

Figure 4C:
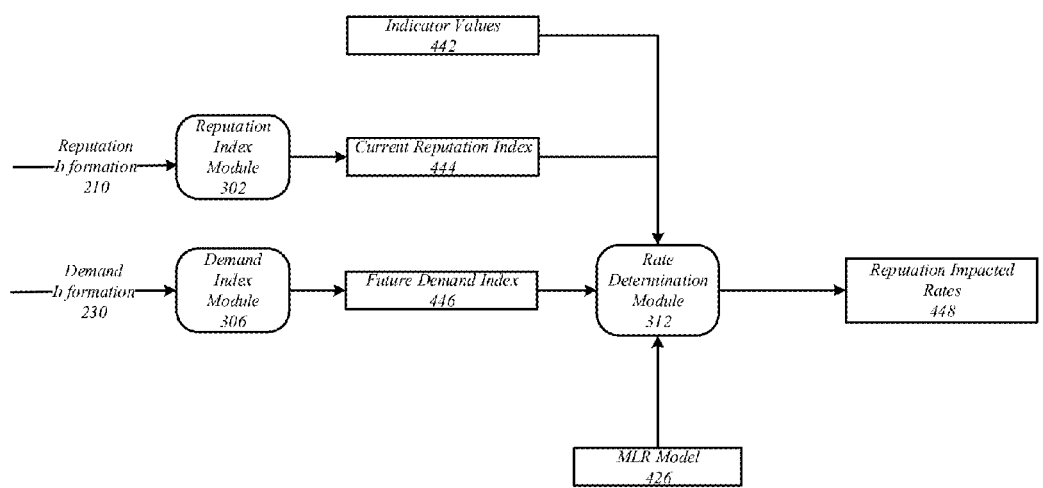

FIG. 4C illustrates an embodiment of the rate integration system 305 determining a reputation impacted rate for a product based on the MLR model 426 and the one or more parameters $\tilde{\beta}$. For example, the MLR model 426 including the determined one or more parameters $\tilde{\beta}$ using indicator values 442, a current reputation index 444, and a future demand index 446 may be used to generate a predicted rate index $$\overline{\text{Rate Index}}_{\hat{\tau},j}$$

and one or more reputation impacted rates 448 for dates in a future time period for a product.

$$\overline{\text{Rate Index}}_{\hat{\tau},j} = \overline{\beta_0} + \overline{\beta_1} * \text{Reputation Index}_{current} + \overline{\beta_2} * \text{Weekday}_j + \\ \overline{\beta_3} * \text{Demand Index}_j + \overline{\beta_4} * \text{Busy Day Indicator}_j + \\ \overline{\beta_5} * \text{Reputation Index}_{current} * \text{Weekday}_j \quad (4)$$

In equation 4, j represents future occupancy dates, $\hat{\tau}$ is the selected lead time that was determined to have a maximum positive correlation and $\tilde{\beta}$ represents the one or more parameters.

In various embodiments, the rate determination module 312 may receive the information necessary to generate the predicted rate index $$\overline{\text{Rate Index}}_{\hat{\tau},j}$$

from various modules of the rate integration system 305 and servers. For example, the rate determination module 312 may use the MLR model 426 including the one or more parameters $\tilde{\beta}$ determined by the MLR module 310 as the basis for equation 4.

In some embodiments, the rate determination module 312 may also receive or retrieve indicator values 442 for use with the MLR model 426 to generate the predicted rate index $$\overline{\text{Rate Index}}_{\hat{\tau},j}$$

and one or more reputation impacted rates 448 for a product for dates in a specified future time period. The rate determination module 312 may receive or retrieve the indicator value 442 as input/output information 240 and/or demand information 230. The indicator values 442 may include a weekday indicator value (Weekday) and a busy day indicator value (Busy Day Indicator). In some embodiments, the weekday indicator value may be one for an occupancy date during the week and zero if the occupancy date is during a weekend, for example. The busy day indicator value may a value based demand above a particular level. For example, the busy day value may be set to one and indicate dates having an occupancy rate above a percentage threshold, such as 95%. If the occupancy rate is not above a percentage threshold, the busy day indicator may be set to zero, for example. Various embodiments are not limited to this example and the percentage threshold may be adjustable or configurable, for example.

The rate determination module 312 may also receive or retrieve a current reputation index 444 from the reputation index module 302. In embodiments, the current reputation index 444 may represent the most current or recent reputation for the product based on historical reputation information. The current reputation index 444 can include a plurality of dates each associated with a ratio between a reputation management score for the product and an average of the reputation management scores for the product and the competing products. As previously discussed, the reputation management score can include one or more of quantitative information and qualitative information for reviews of a product or a provider of the product.

The rate determination module 312 can receive or retrieve a future demand index 446 from the demand index module 306. The future demand index 446 may be based on projected and calculated future demand for a product. In the case of the hotel, for example, the future demand index 446 may include information based on bookings and projected occupancy rates for future dates. The projected occupancy rates for future dates may be received from the demand server 130 as demand information 230, for example. Similar to the demand indices 406, the future demand index 446 may include a plurality of dates each associated with a ratio between a demand value for the product and an average of demand values for the product and competing products.

In various embodiments, the rate determination module 312 may generate the predicted rate index and determine one or more reputation impacted rates 448 in the predicted rate index based on the indicator values 442, the current reputation index 444, the future demand index 446 and the MLR model 426. Moreover, the rate determination module 312 may determine reputation impacted rates 448 for any number of dates or periods in the future including for the next week, month, year and so forth from the predicted rate index. In addition, the predicted rate index and reputation impacted rates 448 may be updated or recalculated on an hourly basis, daily basis, weekly basis and so forth. In some embodiments, the reputation impacted rates 448 may be recalculated as more reputation information 210, rate information 220 and/or demand information 230 is gathered for the product and competing products. In some embodiments, the reputation impacted rate 448 may be further refined and adjusted based on input/output information 240, for example.

Figure 4D:
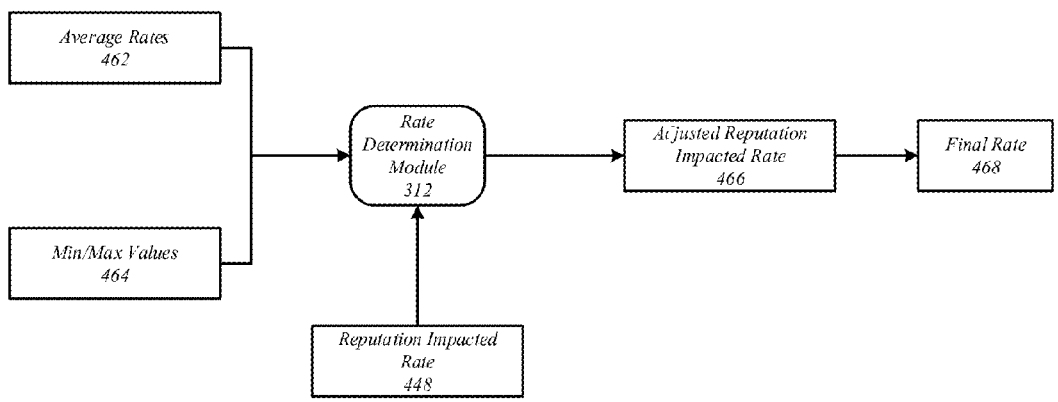

FIG. 4D illustrates an embodiment of the rate integration system 305 determining an adjusted reputation impacted rate 466 and final rate 468. The rate determination module 312 may refine or adjust the reputation impacted rates 448 by multiplying the reputation impacted rates 448 in the predicted rate index by an average rate of competitor's products and the product, as illustrated in Equation 5.

$$\text{Adjusted Reputation Impacted Rate} = \overline{\text{Rate Index}_{T,j}} * \overline{\text{Rate of Competitors}} \quad (5)$$

In equation 5, j may be the future occupancy dates for a product. In some embodiments, the rate determination module 312 may receive the average rates 462 for the product and competitor products based on rate information 220 from the rate index module 304. The rate index module 304 may gather and/or receive the rate information 220 including future rates for the product and the competitor's products from the rate information server 120 which may conduct a web-based crawl to gather the rate information 220, for example.

Further, the rate determination module 312 may modulate the adjusted reputation impacted rate 466 between minimum and maximum (min/max) values 464 and select a final rate 468 closest to a best available rate for the product in a range of rates provided by the client of the reputation impacted rate, for example. Equations 6 and 7 may be used to modulate the adjusted reputation impacted rate 466 between a minimum value (equation 6) and a maximum value (equation 7).

$$\text{adjusted reputation impacted rate}_{min} = \quad (6)$$
$$\max\!\left(\!\left(\overline{\text{Rate Index}_{T,j}} * \overline{\text{Rate of Competitors}}\right), \text{best available rate}\right)$$

$$\text{adjusted reputation impacted rate}_{max} = \quad (7)$$
$$\min\!\left(\max\!\left(\!\left(\overline{\text{Rate Index}_{T,j}} * \overline{\text{Rate of Competitors}}\right), \text{best available rate}\right),\right.$$
$$\left. \alpha * \text{best available rate}\right)$$

In equations 6 and 7, the best available rate may be a web-based best available rate for the product and received as input/output information 240, for example. Once the range of adjusted impacted rates between a minimum value and a maximum value is defined, the rate determination module 312 may select a final rate 468 closest to a rate provided by the client of the reputation impacted rate. The final rate 468 may be presented to a user as the rate when the product is being purchased. Various embodiments are not limited in this manner, and in some embodiments, the client may select a final rate 468 within the range or adjusted impacted rates.

Figure 5:
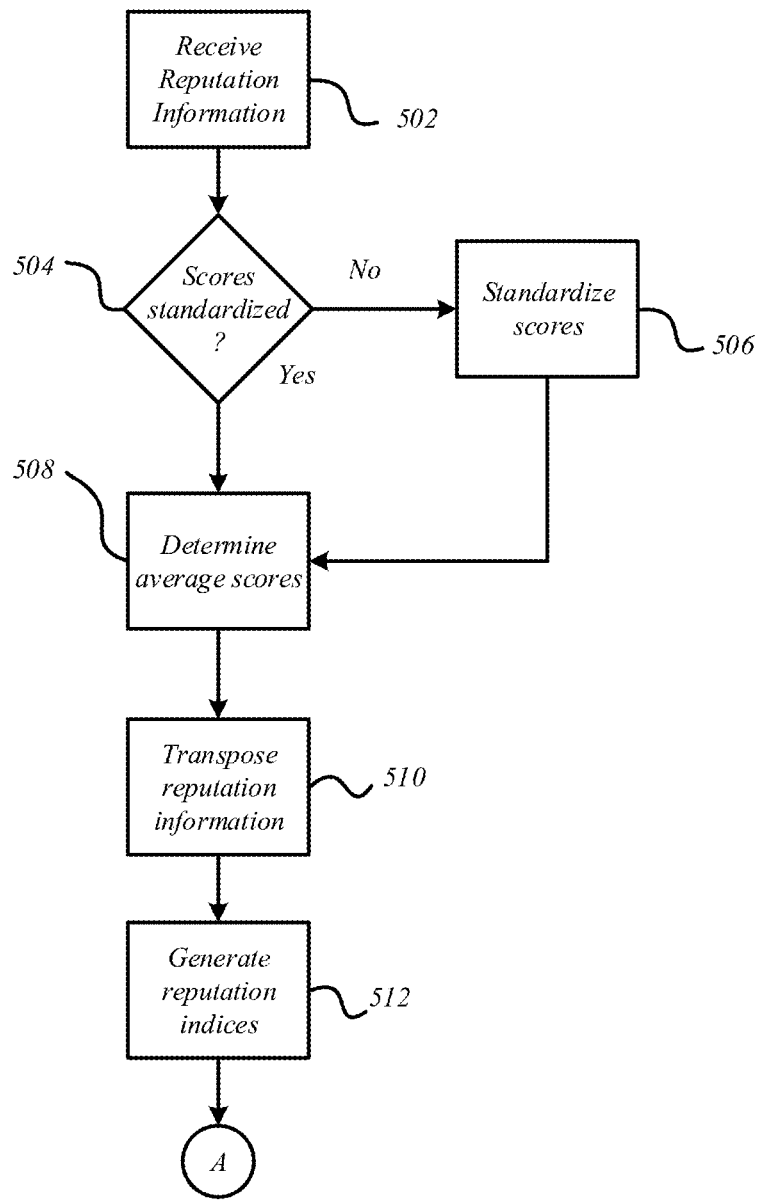
FIG. 5 illustrates an example embodiment of a logic flow to generate reputation indices.

FIG. 5 illustrates an embodiment of a logic flow 500 to determine and generate reputation indices. In some embodiments, the logic flow 500 may be representative of some or all of the operations executed by one or more embodiments described herein. For example, the logic flow 500 illustrates operations that may be performed by a systems 100, 200 and the rate integration system 305 including a reputation index module 302. Moreover, FIG. 5 is discussed with reference to the elements of FIGS. 1, 2A-2F, and 3. However, various embodiments are not limited in this manner and any computing system may perform the operations discussed in logic flow 500.

At block 502, a rate integration system 305, and in particular, a reputation index module 302 may receive reputation information from one or more systems or servers, such as a reputation information server 110. The reputation information can be for one or more products including the product for which the reputation impacted rate is being determined and competing products from competitors. The reputation information can include historical reputation information from the prior one to twelve months for the product and competing product. Various embodiments are not limited in this manner and the reputation information may be historical reputation information for any amount of time.

Among other information, the reputation information may include product IDs, reputation dates, and reputation management scores further having one or more of quantitative information and qualitative information for the products. In some embodiments, the reputation information including reputation management scores may be received in a standardized format for each of the products and, thus, can be easily used to generate a reputation index. However, various embodiments are not limited in this manner and in some embodiments the reputation information may be received from one or more sources in an un-standardized format.

At decision block 504, the reputation index module 302 may determine whether the reputation management scores are standardized or not. If the reputation management scores are not standardized, the reputation index module 302 may standardized the reputation management scores at block 506. For example, the reputation index module 302 may perform various operations to convert qualitative information into a numerical score, adjust the scales for both quantitative information and qualitative information such that there are no negative numbers, and/or convert the reputation management scores to a standard scale. Various embodiments, are not limited in this manner and other standardization operations may be performed on the reputation information by different modules, components, or software. For example and in some embodiments, SAS's Sentiment Analysis® software may be used to convert qualitative information into a numerical score.

In logic flow 500 at block 508, the reputation index module 302 may determine an average reputation management score for associated with each reputation date in the reputation information for the product for which the reputation impacted rate is being determined and competing products. The average reputation management score may be an average score of all of the reputation management scores on a particular date, for example.

The reputation index module 302 may also determine average reputation management scores for competing products. Similarly, the average reputation management scores for competing product may be an average of all the reputation management scores on each date. In other words, each product may have a plurality of average reputation management scores each associated with a particular date based on all of the reputation management scores for that product on that date. In addition, the reputation index module 302 may determine, for example, a 28-day moving average reputation management score for each product to smooth out any outlier information.

In some embodiments, the reputation index module 302 may transpose the reputation information at block 510. More specifically, the reputation index module 302 may transpose the 28-day moving average reputation management scores for each product so that there is a reputation management score which may be an average reputation management score, and a 28-day moving average reputation management score for each date in a reputation index and for each of the products. The scores may be transposed so that the reputation score of the product and the average reputation score of the competing products (and the product) may be compared.

At block 512, the reputation index module 302 can generate one or more reputation indices. For example, each product may be associated with a reputation index which each may have a plurality of dates associated with a ratio of the average reputation management score for a product and an average of average reputation management scores for the product and competing products. In other words, each product may have a reputation index which includes dates and associated ratios for those dates. The reputation indices may be used to determine and select a rate index having a maximum correlation with a reputation index and to determine reputation impacted rates.

Figure 6:
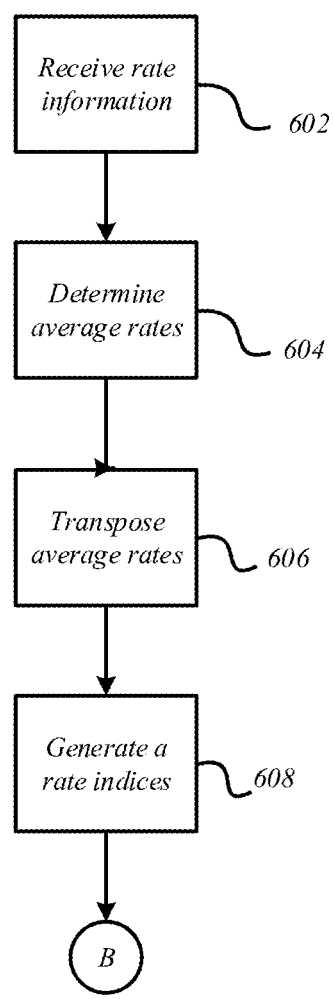
FIG. 6 illustrates an example embodiment of a logic flow to generate rate indices.

FIG. 6 illustrates an embodiment of a logic flow 600 to determine and generate rate indices. In some embodiments, the logic flow 600 may be representative of some or all of the operations executed by one or more embodiments described herein. For example, the logic flow 600 illustrates operations that may be performed by a systems 100, 200 and the rate integration system 305 including a rate index module 304. Moreover, FIG. 6 is discussed with reference to the elements of FIGS. 1, 2A-2F, and 3. However, various embodiments are not limited in this manner and any computing system may perform the operations discussed in logic flow 600.

At block 602, rate information may be received by a rate index module 304. The rate information may be received for one or more products including a product for which a reputation impacted rate is being determined and competing products. The rate information can include, for example, historical rate information from the prior one to twelve months for the product and competing product. In some embodiments, future rate indices may be generated based on rate information including future rate information for some future period of time.

In some embodiments, the rate information may include a product ID to identify the product, the rate or price of the product, and the rate date. The rate may be a monetary value for the product. For example, the rate may be the price or cost in dollars (or any other currency) for the product. Further and as previously discussed, the rate may be associated with a particular rate date. For example, in the case of a hotel room, the rate may be the price per night and the rate date may be the date for that nightly price. Various embodiments are not limited in this manner.

In some embodiments, an average rate for one or more products may be determined by the rate index module 304 at block 604. More specifically, the rate for a product may change over time and the average rate may be determined. For example and in the case of a hotel room, a room may even have different rates for the same date. Thus, an average rate for a product for each particular date may be determined or calculated by the rate index module 304. In some embodiments, the average rate for each date for a product can be used when generating a rate index for the product. The rate index module 304 may also determine 28-day moving average rates for each product. In some embodiments, the average rate for each date may be an average rate of all the rates on that date, including a rate for the product for which the reputation impacted rate is be determined and competing products.

Various embodiments are not limited in this manner.

At block 606, the rate information may be transposed by the rate index module 304. More specifically, the rate index module 304 may transpose the rate information such that there is a rate and an average rate associated with each product for each date. In embodiments, the average rate may be the combined average rate for all of the products on a particular date. The rate information for the product and competitor products may be transposed such that rate for the product may be compared to an average rate for competitor products and the product.

The rate index module 304 may generate a rate index for each product at block 608. The rate indices may include a plurality of dates each associated with a ratio of a median or average rate for the product and an average of median or average rates for the product and competing products. In some embodiments and as previously discussed, the rate index for the product for which the reputation impacted rate is being determined may be used to generate a plurality of lead time rate indices. A maximum correlation may be determined between one of the lead time rate indices and the reputation index for use in determining an optimal lead time and generating an MLR model and a predicted rate index for determining reputation impacted rates.

Figure 7:
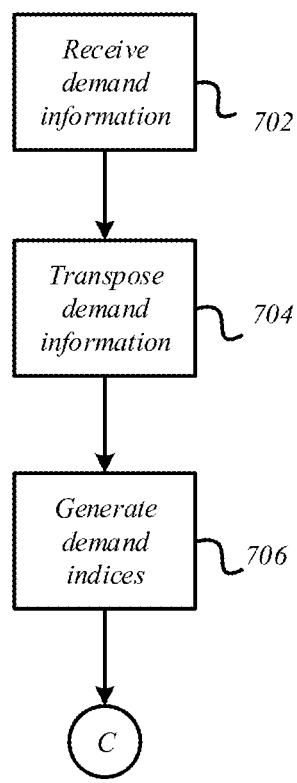
FIG. 7 illustrates an example embodiment of a logic flow to generate demand indices.

FIG. 7 illustrates an embodiment of a logic flow 700 to determine and generate demand or future indices. In some embodiments, the logic flow 700 may be representative of some or all of the operations executed by one or more embodiments described herein. For example, the logic flow 700 illustrates operations that may be performed by a systems 100, 200 and the rate integration system 305 including a demand index module 306. Moreover, FIG. 7 is discussed with reference to the elements of FIGS. 1, 2A-2F, and 3. However, various embodiments are not limited in this manner and any computing system may perform the operations discussed in logic flow 700.

At block 702, a demand index module 306 may receive demand information. The demand information can be for one or more products. The demand information can include historical and future demand information for the product and competing products.

In embodiments, the demand information may include product ID, occupancy information, busy day information, and occupancy date. The demand information including the occupancy information can include a measurement or metric of a consumer's wiliness to pay a rate for a specific product or service. In the case of a hotel room, this measurement or metric may include occupancy information which may be a percentage of rooms occupied on the occupancy date. For example, the occupancy information may indicate that a hotel is at 95% occupancy or 95% of the rooms are occupied on a particular night. Various embodiments are not limited to this example and, in some embodiments, the measurement or metric may be different for different products. For example, in the case of a flight the metric can be the measurement or percentage of the fullness of a plane. In another example and in the case of a restaurant, the measurement may be a percentage of tables occupied or reserved. Other metrics and measurements may be used for products.

At block 704, the demand index module 306 may transpose the demand information such that each occupancy date is associated with a demand or occupancy value and an average demand value which may be the average of all the demand values for the product and all the competing products. The demand value for the product may be transposed with an average demand information for competing products (and the product) such that they may be compared.

Further and at block 706, demand indices may be generated by the demand index module 306. For example, each product may have an associated demand index including a plurality of dates each associated with a ratio between a demand value for the product and an average of demand values for competitor products. In some embodiments, the demand indices for the products may be future demand indices used for generating a predicted rate index.

Figure 8A:
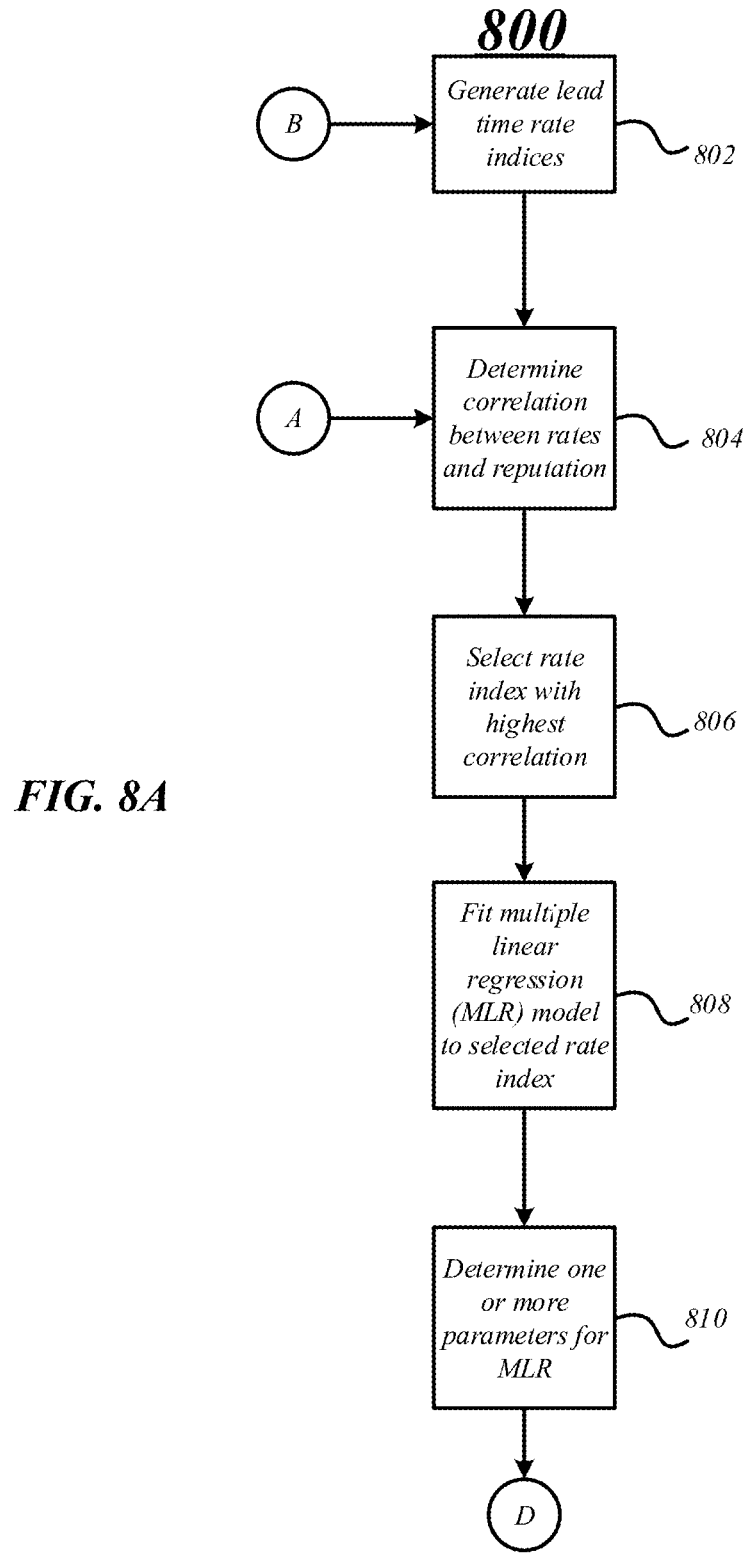
FIGS. 8A/8B illustrates an example embodiment of a logic flow to generate reputation impacted rates.
Figure 8B:
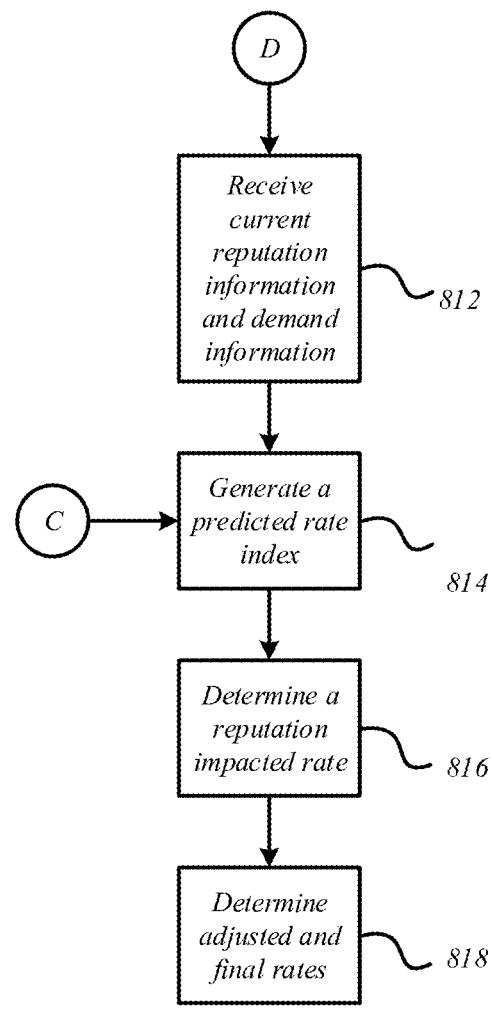

FIGS. 8A/8B illustrate an embodiment of a logic flow 800 to generate reputation impacted rates for a product. In some embodiments, the logic flow 800 may be representative of some or all of the operations executed by one or more embodiments described herein. For example, the logic flow 800 illustrates operations that may be performed by a systems 100, 200 and the rate integration system 305. Moreover, FIGS. 8A/8B is discussed with reference to the elements of FIGS. 1, 2A-2F, and 3. However, various embodiments are not limited in this manner and any computing system may perform the operations discussed in logic flow 800.

At block 802, one or more lead time rate indices may be generated by a rate index module 304. The lead time rate indices can be used to determine a correlation between rates and reputations of a product. As can be appreciated, a particular date for a reputation management score may not directly correspond to a date for a rate for a product. More specifically, there may be lead (or lag) time between the date on which the product was purchased and a date of a reputation management score for the product. In some embodiments, the rate index module 304 may generate the lead time rate indices by shifting the date backwards or negatively in time in a rate index for the product. Thus, a plurality of lead time rate indices may be generated from a single rate index for a product with each having a different adjustment or shift in time. For example, the dates in a rate index generated above in FIG. 6 may be shifted backwards in time by 7, 14, 21, 28, 35 or 42 days to generate a plurality of rate indices each having a different lead time.

The logic flow 800 may include determining, by a correlation module 308, correlations between rates and reputations using the lead time rate indices and a reputation index for the product for which the reputation impacted rate is be determined at block 804. For example, the reputation index generated above and as discussed in FIG. 5 may be used to determine correlations between rates and reputations. Further and at block 806, the lead time rate index having the highest positive correlation with the reputation index is selected as an optimal rate index for use in generating a multiple linear regression model. Moreover, the lead time associated with the optimal rate index or the rate index having the highest positive correlation may be considered the optimal lead time. For example, if the lead time associated with the rate index is 7 and this rate index has the highest positive correlation with the reputation index, then the optimal lead time is 7. The maximum correlation may be determined by utilizing a maximum correlation determination function as discussed above with respect to equations 1 and 2.

At block 808, a multiple linear regression model may be fit to the optimal rate index having the highest correlation by a MLR module 310 as discussed above with respect to FIG. 4B. Further, the MLR module 310 may determine one or more parameters for the MLR model at block 810. More specifically, the MLR module 310 may determine or fit a multiple linear regression (MLR) model to the optimal rate index using the reputation index for the product, and weekday and weekend indicators as independent variables. Further and when fitting the MLR model to optimal rate index, the MLR module 310 may determine one or more parameters for MLR model.

In embodiments, the logic flow 800 may include receiving current reputation information and future demand information for the product at block 812. The current reputation information may be the most current or the reputation information gathered on the date that the reputation impacted rate is being determined. Further, the future demand information may be demand values for future dates based on expected, calculated or predicted demand. For example, the future demand information may be based on predicted occupancy rates for a hotel based on bookings.

In addition, the current reputation information may be used by a reputation index module 302 to generate a current reputation index and the future demand information may be used by a demand index module 306 to generate a future demand index, as discussed above with respect to FIG. 7. The current reputation index, future demand index, the one or more parameters determined at block 812 and one or more indicator values may be used to generate a predicated rate index at block 814, as discussed above with respect to FIG. 4C. The predicated rate index may include reputation impacted rates associated with future dates. More specifically and at block 816, each date for a future time period may be associated with a reputation impacted rate that may be used for that date when determining a rate for the product. Further, the rate determination module 310 may adjust the reputation impacted rates in the predicated rate index by multiplying them by an average rate of the competitor's products and the product's rate.

Further and at block 818, a rate determination module 310 may determine an adjusted reputation impacted rate and a final rate for use in pricing the product. More specifically, the rate determination module 310 may adjust the reputation impacted rates in the predicted rate index between a minimum value and maximum value as set by a user of the rate integration system. Finally, the rate determination module 310 may select a final rate for use for the product based on a closest available rate to a user selected range of values.

The adjusted reputation impacted rate and the final rate may be provided to a consumer of rates, such as a user of the one or more computing devices 140 as input/output information 240. As previously mentioned, the one or more computing devices 140 may be representative of a networking environment for the consumer of the reputation impacted rate, adjusted reputation impacted rate, and final rate for a product. For example, the one or more computing devices 140 may be in a computing system of a hotel, airline, rental car company, and so forth. Various embodiments are not limited to these examples.

The rates may be provided to the computing devices 140 on a periodic, semi-periodic, or an occasional basis. For example, the rates may be provided as much as three or four times a day or as little as once every day. Various embodiments are not limited in this manner and the frequency in which the rates are provided may be configured or determined by a user or a module of the system. In some embodiments, the client may request rates for a product manually as a manual override.

In some embodiments, the rates may be received by the computing devices 140 and may be formatted in such a way to be presented to an end user or purchaser of the product. For example, a final rate may be formatted for display in a webpage or on a website. The rates may be sent for displaying on a website in a HyperText Markup Language (HTML) format, an Extensible Markup Language (XML) format, or in any other format, for example. Various embodiments are not limited in this manner. In some embodiments, the rates may be sent to a selling system which may present the rates for the product to a purchaser of the product.

In various embodiments, the rates including the final rate may be displayed to a user of the system in a text format as a listing on a webpage in one example. In another example the rates including the final rate may be displayed in a graphical format in a graphical user interface along with other competitor product rates in a quadrant graph, in an index graph, and so forth. Various embodiments are not limited in this manner and the rates may be displayed to a user in any number of ways.

Figure 9:
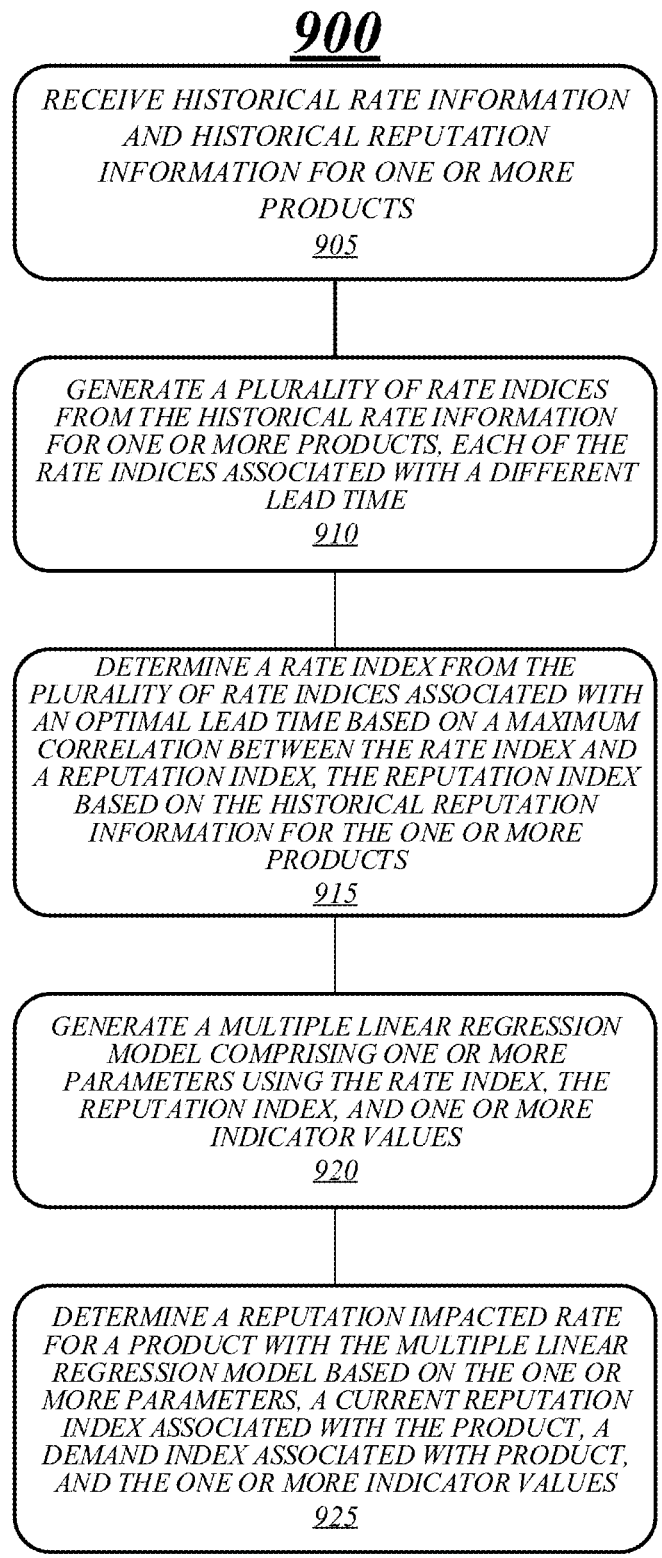
FIG. 9 illustrates an example embodiment of a logic flow to generate reputation impacted rates.

FIG. 9 illustrates an exemplary embodiment of logic flow 900. The logic flow 900 may be representative of some or all of the operations executed by one or more embodiments described herein. For example, the logic flow 900 may illustrate operations performed by the systems and logic flows of FIGS. 1-8.

In the illustrated embodiment shown in FIG. 9, the logic flow 900 may include receiving historical rate information and historical reputation information for one or more products. The historical rate information may include one or more rates for one or more products. In some embodiments, a particular rate may be associated with a particular rate date. Further, the historical rate information may include the rates for products for a specified period of time, such as the past week, month, year and so forth and each date in the specified period of time may have a rate for the product.

Moreover, the historical reputation information may include at least one of quantitative information and qualitative information for one or more products. In some embodiments, the historical reputation information may include reputation management scores for the one or more products based on information on online reviews, for example. In some embodiments, each product may have one or more reputation management scores associated with particular reputation dates. Moreover, each reputation date may have more than one reputation management score for a product. For example, a number of review and ranking may be provided for a product on a single reputation date.

In some embodiments, the logic flow 900 may include generating a plurality of rate indices from the historical rate information for one or more products, each of the rate indices associated with a different lead time at block 910. Further, in some embodiments, the rate indices may be lead time rate indices having dates shifted to determine a lead/lag between a rate date and a reputation date. For example, the lead time rate indices can have dates shifted (positively or negatively) to compensate for a lead or lag between rates and reputations. These rate indices can be lead time rate indices each having a separate lead time, such as 7, 14, 21, 28, 35, and 42 days. In some embodiments, the lead time rate indices are only generated for the product in which the reputation impacted rate is being determined. However, various embodiments are not limited in this manner.

At block 915, the logic flow 900 may include determining a rate index from the plurality of rate indices associated with an optimal lead time based on a maximum correlation between the rate index and a reputation index, the reputation index based on the historical reputation information for the one or more products. For example, a correlation determination may be made between each of the lead time rate indices and a reputation index for the product to determine an optimal rate index. In other words, the optimal rate index may be the lead time rate index having the maximum positive correlation with the reputation index.

The logic flow 900 at block 920 can also include generating a multiple linear regression model comprising one or more parameters using the rate index, the reputation index, and one or more indicator values. More specifically, the optimal rate index may be fitted to a multiple linear regression model including one or more parameters, the reputation index and other indicator values such as weekday and busy day indicator values.

Further and at block 925, the logic flow 900 may include determining a reputation impacted rate for a product with the multiple linear regression model based on the one or more parameters, a current reputation index associated with the product, a demand index associated with product and the one or more indicator values. More specifically, the multiple linear regression may be adjusted to generate or determine a predicted rate index for future dates. The multiple linear regression model may include the one or more parameters determine above at block 920, the current reputation index, a future demand index, and one or more indicator values such as weekday and busy day indicators.

Figure 10:
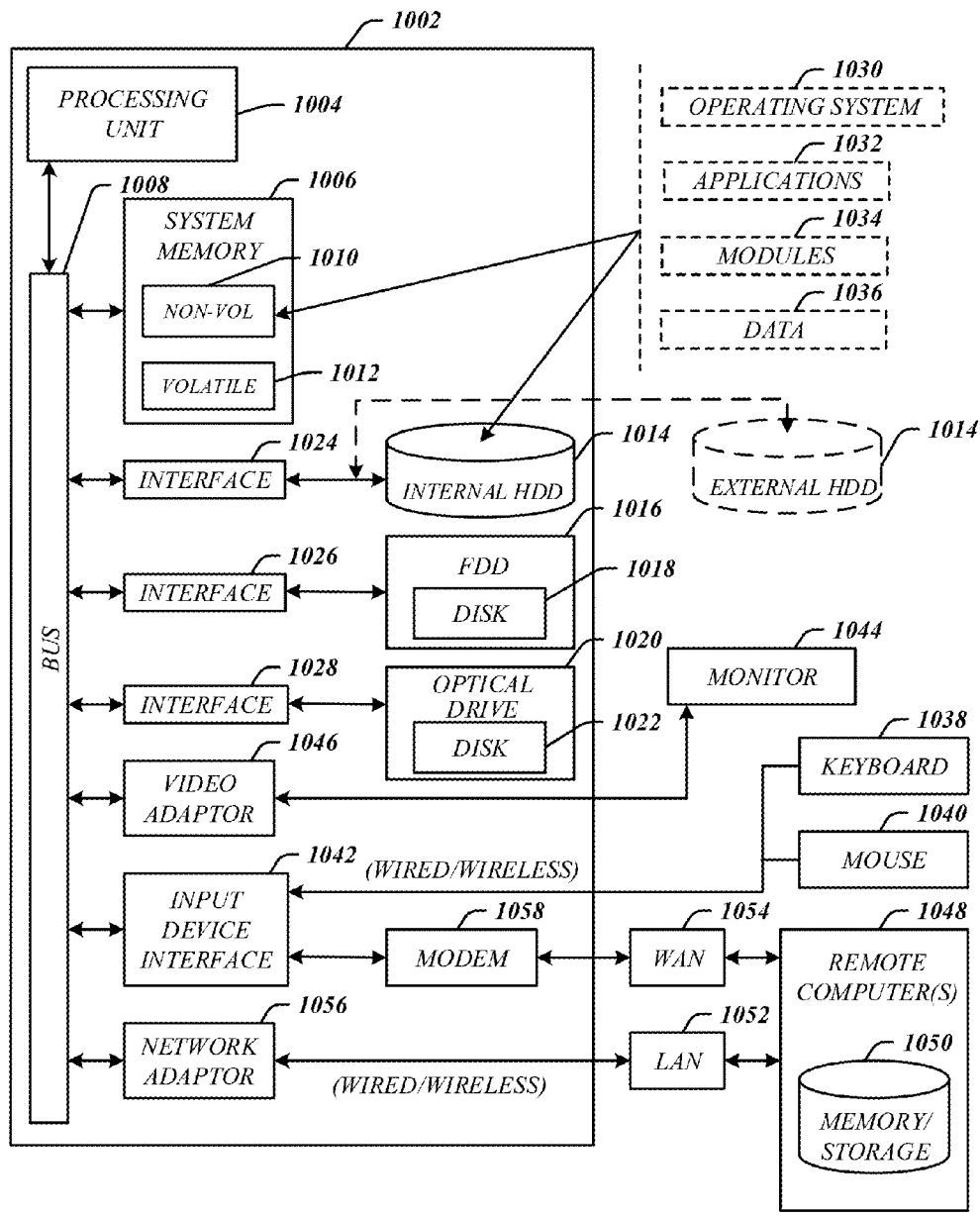
FIG. 10 illustrates an example embodiment of a computing architecture to determine reputation impacted rates.

FIG. 10 illustrates an embodiment of an exemplary computing architecture 1000 suitable for implementing various embodiments as previously described. In one embodiment, the computing architecture 1000 may comprise or be implemented as part of computing systems of FIGS. 1-3, 4A-4D and used to implement logic flows 500, 600, 700, 800 and architecture 1000.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as transmissions allocated to various transmission lines. In such allocations, each message is a transmission. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors. Processing unit 1004 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing unit 1004 may be connected to and communicate with the other elements of the computing system via an interconnect. Further, processing unit 1004 may include other components, such as an uncore component including logic to process information, instructions, and so forth not essential to core processing.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives, non-volatile memory 1010, and volatile memory 1012, including an operating system 1030, one or more application programs 1032, other program modules 1034, and program data 1036. In one embodiment, the one or more application programs 1032, other program modules 1034, and program data 1036 can include, for example, the various applications and/or components of the system 305.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

The various elements of the computer systems as previously described with reference to FIGS. 1-5 may involve various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

What is claimed is:

1. An apparatus, comprising:
   a network interface;
   memory to store instructions; and
   processing circuitry coupled with the network interface and the memory, the processing circuitry operable to execute the instructions, that when executed, cause the processing circuitry to:
   generate a plurality of rate indices from historical rate information for one or more products, each of the rate indices associated with a different lead time, each of the different lead times is a different number of days between a rate date for the historical rate information and a reputation date for the historical reputation information,
   perform a correlation function on each of the plurality rate indices and a reputation index to determine a correlation coefficient for each of the plurality rate indices, each of the plurality rate indices associated with one of the different lead times, the reputation index based on the historical reputation information for the one or more products,
   determine a rate index from the plurality of rate indices associated with an optimal lead time based on one of the correlation coefficients indicating a maximum correlation between the rate index and the reputation index,
   generate a multiple linear regression model comprising one or more parameters using the rate index, the reputation index and one or more indicator values, and
   determine a reputation impacted rate for a product with the multiple linear regression model based on the one or more parameters, a current reputation index associated with the product, a demand index associated with the product, and the one or more indicator values.

2. The apparatus of claim 1, the processing circuitry to determine an adjusted reputation impacted rate for the product by multiplying the reputation impacted rate determined from the multiple linear regression model with an average rate for the one or more products.

3. The apparatus of claim 2, the processing circuitry to determine the adjusted reputation impacted rate for the product between a minimum value and a maximum value based on a determined lowest available rate.

4. The apparatus of claim 2, the processing circuitry to select a final rate within a defined range and closest in value to the adjusted reputation impacted rate to use for the product.

5. The apparatus of claim 1, wherein each of the plurality of rate indices comprises a plurality of dates each associated with a ratio between a median rate for the product and an average of median rates for competitor products.

6. The apparatus of claim 1, wherein the historical reputation information comprises at least one of quantitative information and qualitative information, and the processing circuitry to determine reputation management scores for the product and reputation management scores for competitor products based on the historical reputation information.

7. The apparatus of claim 6, the processing circuitry to determine the reputation index comprising a plurality of dates each associated with a ratio between a reputation management score for the product and an average of the reputation management scores for the competitor products.

8. The apparatus of claim 1, the processing circuitry to determine the demand index comprising a plurality of dates each associated with a ratio between a demand value for the product and an average of demand values for competitor products.

9. The apparatus of claim 1, wherein the one more indicator values comprises at least one of weekday information, weekend information, busy day information, and occupancy information.

10. The apparatus of claim 1, comprising:
the memory to store one or more rates including the final rate;
a memory controller coupled with the memory; and
an input/output controller.

11. The apparatus of claim 1, the processing circuitry to determine the optimal lead time from the different lead times associated with the rate indices, the optimal lead time comprising one of the different lead times associated with the rate index having the maximum correlation with the reputation index.

12. The apparatus of claim 1, comprising:
a display device to display one or more rates including the final rate in a text format or in a graphical format.

13. At least one non-transitory computer-readable storage medium comprising instructions that when executed cause processing circuitry to:
receive, via a network interface, historical rate information and historical reputation information for one or more products;
generate, by the processing circuitry, a plurality of rate indices from the historical rate information for one or more products, each of the rate indices associated with a different lead time, each of the different lead times is a different number of days between a rate date for the historical rate information and a reputation date for the historical reputation information;
perform, by the processing circuitry, a correlation function on each of the plurality rate indices and a reputation index to determine a correlation coefficient for each of the plurality rate indices, each of the plurality rate indices associated with one of the different lead times and the reputation index based on the historical reputation information for the one or more products;
determine, by the processing circuitry, a rate index from the plurality of rate indices associated with an optimal lead time based on one of the correlation coefficients indicating a maximum correlation between the rate index and the reputation index;
generate, by the processing circuitry, a multiple linear regression model comprising one or more parameters using the rate index, the reputation index, and one or more indicator values; and
determine, by the processing circuitry, a reputation impacted rate for a product with the multiple linear regression model based on the one or more parameters, a current reputation index associated with the product, a demand index associated with the product, and the one or more indicator values.

14. The non-transitory computer-readable storage medium of claim 13, comprising instructions that when executed cause the processing circuitry to determine an adjusted reputation impacted rate for the product by multiplying the reputation impacted rate determined from the multiple linear regression model with an average rate for the one or more products.

15. The non-transitory computer-readable storage medium of claim 14, comprising instructions that when executed cause the processing circuitry to determine the adjusted reputation impacted rate for the product between a minimum value and a maximum value based on a determined lowest available rate.

16. The non-transitory computer-readable storage medium of claim 14, comprising instructions that when executed cause the processing circuitry to select a final rate within a defined range and closest in value to the adjusted reputation impacted rate to use for the product.

17. The non-transitory computer-readable storage medium of claim 16, comprising instructions that when executed cause the processing circuitry to display the final rate in a text format or in a graphical format in a graphical user interface.

18. The non-transitory computer-readable storage medium of claim 13, wherein each of the plurality of rate indices comprises a plurality of dates each associated with a ratio between a median rate for the product and an average of median rates for competitor products.

19. The non-transitory computer-readable storage medium of claim 13, wherein the historical reputation information comprises at least one of quantitative information and qualitative information, and the computer-readable storage medium comprising instructions that when executed cause the processing circuitry to determine reputation management scores for the product and reputation management scores for competitor products based on the historical reputation information.

20. The non-transitory computer-readable storage medium of claim 19, wherein the reputation index comprises a plurality of dates each associated with a ratio between a reputation management score for the product and an average of the reputation management scores for the competitor products.

21. The non-transitory computer-readable storage medium of claim 13, wherein the demand index comprises a plurality of dates each associated with a ratio between a demand value for the product and an average of demand values for competitor products.

22. The non-transitory computer-readable storage medium of claim 13, wherein the one more indicator values comprises at least one of weekday information, weekend information, busy day information, and occupancy information.

23. The non-transitory computer-readable storage medium of claim 13, comprising instructions that when executed cause the processing circuitry to determine the optimal lead time from the different lead times associated with the rate indices, the optimal lead time comprising one of the different lead times associated with the rate index having the maximum correlation with the reputation index.

24. A computer-implemented method, comprising:
  receiving, via a network interface, historical rate information and historical reputation information for one or more products;
  generate, by the processing circuitry, a plurality of rate indices from the historical rate information for one or more products, each of the rate indices associated with a different lead time, each of the different lead times is a different number of days between a rate date for the historical rate information and a reputation date for the historical reputation information;
  perform, by the processing circuitry, a correlation function on each of the plurality rate indices and a reputation index to determine a correlation coefficient for each of the plurality rate indices, each of the plurality rate indices associated with one of the different lead times and the reputation index based on the historical reputation information for the one or more products;
  determine, by the processing circuitry, a rate index from the plurality of rate indices associated with an optimal lead time based on one of the correlation coefficients indicating a maximum correlation between the rate index and the reputation index;
  generating, by the processing circuitry, a multiple linear regression model comprising one or more parameters using the rate index, the reputation index and one or more indicator values; and
  determining, by the processing circuitry, a reputation impacted rate for a product with the multiple linear regression model based on the one or more parameters, a current reputation index associated with the product, a demand index associated with the product, and the one or more indicator values.

25. The computer-implemented method of claim 24, comprising determining, by the processing circuitry, an adjusted reputation impacted rate for the product by multiplying the reputation impacted rate determined from the multiple linear regression model with an average rate for the one or more products.

26. The computer-implemented method of claim 25, comprising determining, by the processing circuitry, the adjusted reputation impacted rate for the product between a minimum value and a maximum value based on a determined lowest available rate.

27. The computer-implemented method of claim 25, comprising selecting, by the processing circuitry, a final rate within a defined range and closest in value to the adjusted reputation impacted rate to use for the product.

28. The computer-implemented method of claim 24, wherein each of the plurality of rate indices comprises a plurality of dates each associated with a ratio between a median rate for the product and an average of median rates for competitor products.

29. The computer-implemented method of claim 24, wherein the historical reputation information comprises at least one of quantitative information and qualitative information, and the computer-readable storage medium comprising instructions that when executed cause the processing circuitry to determine reputation management scores for the product and reputation management scores for competitor products based on the historical reputation information.

30. The computer-implemented method of claim 29, wherein the reputation index comprises a plurality of dates each associated with a ratio between a reputation management score for the product and an average of the reputation management scores for the competitor products.

31. The computer implemented method of claim 30, wherein the demand index comprises a plurality of dates each associated with a ratio between a demand value for the product and an average of demand values for competitor products.

32. The computer-implemented method of claim 24, wherein the one more indicator values comprises at least one of weekday information, weekend information, busy day information, and occupancy information.

33. The computer-implemented method of claim 24, comprising:
  determining the optimal lead time from the different lead times associated with the rate indices, the optimal lead time comprising one of the different lead times associated with the rate index having the maximum correlation with the reputation index.

34. The computer-implemented method of claim 24, comprising:
  displaying the final rate in a text format or in a graphical format on a display device.

* * * * *